(12) United States Patent
Begin et al.

(10) Patent No.: US 10,954,996 B2
(45) Date of Patent: Mar. 23, 2021

(54) TURBOCHARGER BEARING

(71) Applicant: GM Global Technology Operations LLC, Detroit, MI (US)

(72) Inventors: Louis P. Begin, Rochester, MI (US); Dingfeng Deng, Auburn Hills, MI (US); Yuchuan Liu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 92 days.

(21) Appl. No.: 16/455,061

(22) Filed: Jun. 27, 2019

(65) Prior Publication Data

US 2020/0408247 A1 Dec. 31, 2020

(51) Int. Cl.
| | |
|---|---|
| *H02K 7/08* | (2006.01) |
| *H02K 5/16* | (2006.01) |
| *F16C 17/02* | (2006.01) |
| *F16C 17/10* | (2006.01) |
| *F16C 17/18* | (2006.01) |

(Continued)

(52) U.S. Cl.
CPC .......... *F16C 17/026* (2013.01); *F01D 25/166* (2013.01); *F01D 25/18* (2013.01); *F04D 29/057* (2013.01); *F16C 17/26* (2013.01); *F16C 33/105* (2013.01); *F16C 33/107* (2013.01); *F16C 33/1065* (2013.01); *F16C 33/1085* (2013.01); *F05D 2220/40* (2013.01); *F16C 2240/42* (2013.01); *H02K 5/16* (2013.01); *H02K 7/08* (2013.01)

(58) Field of Classification Search
CPC .. F16C 17/026; F16C 33/107; F16C 33/1085; F16C 17/26; F16C 33/1065; F16C 33/105; F16C 2240/42; F04D 29/057; F04D 29/05; F04D 29/046; F04D 25/04; F01D 25/18; F01D 25/166; F05D 2220/40; F05D 417/405; H02K 7/08; H02K 5/16; F02C 6/12
USPC ........................................................ 310/90
See application file for complete search history.

(56) References Cited

U.S. PATENT DOCUMENTS 4,902,144 A * 2/1990 Thoren .................. F16C 17/26
  384/398
6,017,184 A * 1/2000 Aguilar ................... F04D 29/26
  415/112

(Continued)

FOREIGN PATENT DOCUMENTS

EP  0450679 B1  5/1994

*Primary Examiner* — John K Kim
(74) *Attorney, Agent, or Firm* — Vivacqua Crane (57) ABSTRACT

A fluid bearing for operably connecting a shaft to a center housing of a turbocharger is provided. The fluid bearing includes a single-piece bearing sleeve defining a bore between first and second ends that each form a thrust face. The sleeve includes first and second bearing portions proximal to an associated one of the first and second ends, and a shank connecting the first and second bearing portions. Each of the first and second bearing portions includes an outer bearing surface defining a maximum outer diameter, and each of the first and second bearing portions includes an inner bearing surface defining a minimum inner diameter for radially supporting the shaft in the bore. The inner bearing surface is a continuous surface free of grooves. The sleeve has a wall thickness defining oil passages spaced from the inner bearing surface and configured to supply oil to the thrust face.

18 Claims, 5 Drawing Sheets

(51) Int. Cl.
  *F16C 33/10*  (2006.01)
  *F01D 25/18*  (2006.01)
  *F01D 25/16*  (2006.01)
  *F04D 29/057* (2006.01)
  *F16C 17/26*  (2006.01)

(56) References Cited

U.S. PATENT DOCUMENTS

| | | | |
|---|---|---|---|
| 6,709,160 B1* | 3/2004 | Ward | F01D 25/166 |
| | | | 384/286 |
| 9,494,189 B2 | 11/2016 | Begin et al. | |
| 2012/0177314 A1* | 7/2012 | Mavrosakis | F16C 35/067 |
| | | | 384/474 |
| 2013/0121627 A1* | 5/2013 | Jun | F16C 33/128 |
| | | | 384/115 |
| 2013/0163901 A1* | 6/2013 | Kim | F16C 33/726 |
| | | | 384/112 |
| 2013/0234551 A1* | 9/2013 | Yu | F16C 33/1085 |
| | | | 310/90 |
| 2015/0285301 A1* | 10/2015 | Begin | F01D 25/18 |
| | | | 123/568.11 |
| 2020/0408247 A1* | 12/2020 | Begin | F16C 17/026 |

* cited by examiner

TURBOCHARGER BEARING

INTRODUCTION

The present disclosure relates to a turbocharger used in a motor vehicle, and more particularly to a fluid bearing for a turbocharger.

Turbochargers increase the efficiency and power output of internal combustion engines by increasing intake air pressure for the engines. Turbochargers include a turbine spooled by exhaust gases, a compressor driven by the turbine for pressurizing air, and a shaft connecting the turbine and compressor to one another. Because the shaft can rotate at operating speeds up to 300,000 RPM, turbochargers benefit from bearings that support the shaft while reducing friction associated with the same. One example of these bearings is a fluid bearing having an inner bearing surface, which is lubricated to permit the shaft to rotate on a film of oil between the shaft and the inner bearing surface. The film of oil prevents metal-to-metal contact between the shaft and bearings, so as to increase the efficiency and service life of the turbocharger. Furthermore, the inner bearing surface includes axial grooves that define passages for oil to flow from one side of the bearing to the other side of the bearing.

Thus, while current technologies achieve their intended purpose, there is a need for a new and improved turbocharger bearing that addresses these issues.

SUMMARY

According to several aspects of the present disclosure, a fluid bearing for operably connecting a shaft to a center housing of a turbocharger is provided. The fluid bearing includes a single-piece bearing sleeve defining a bore that extends along an axis between first and second ends. Each of the first and second ends forms a thrust face for axially supporting the rotor system in the center housing. The sleeve comprises first and second bearing portions proximal to an associated one of the first and second ends, and a shank connecting the first and second bearing portions. Each of the first and second bearing portions includes an outer bearing surface defining a maximum outer diameter for radially supporting the sleeve on the center housing. In addition, each of the first and second bearing portions also includes an inner bearing surface defining a minimum inner diameter for radially supporting the shaft in the bore. The inner bearing surface is a continuous surface free of any grooves. The sleeve has a wall thickness defining a plurality of oil passages spaced from the inner bearing surface and configured to supply oil to the thrust face.

In one aspect, the shank includes an outer shank surface that defines a plurality of inlets fluidly communicating with an associated one of the oil passages for supplying oil to the same.

In another aspect, each of the first and second bearing portions has an inner sleeve surface extending between the inner bearing surface and the proximal thrust face, and at least one of the inner sleeve surface and the thrust face defines a plurality of outlets fluidly communicating with an associated one of the oil passages for receiving oil from the same.

In another aspect, the outer shank surface defines a reduced outer diameter, and the reduced outer diameter is smaller than the maximum outer diameter of the outer bearing surface.

In another aspect, the inner sleeve surface defines an increased inner diameter, and the increased inner diameter is larger than the minimum inner diameter of the inner bearing surface.

In another aspect, the increased inner diameter of the inner sleeve surface is smaller than the reduced outer diameter of the outer shank surface. The oil passages extend perpendicularly relative to the axis, and the oil passages extend radially inward from the outer shank surface to the inner sleeve surface.

In another aspect, the inner sleeve surface diverges radially outward, relative to the axis, from the inner bearing surface to the thrust face, such that the inner sleeve surface is angularly disposed relative to the axis.

In another aspect, the outer shank surface includes an outer cylindrical surface and a pair of shoulders, with each shoulder being angularly disposed relative to the axis and extending between the outer cylindrical surface and the associated outer bearing surface of the first and second bearing portions.

In another aspect, the oil passages extend from the outer shank surface to the thrust face such that each oil passage is angularly disposed relative to the axis.

In another aspect, the oil passages are angularly spaced from one another about the axis by a common angle.

According to several aspects of the present disclosure, a turbocharger for an internal combustion engine of a motor vehicle is provided. The turbocharger includes a turbine housing defining a turbine chamber, a compressor housing defining a compressor chamber, and a center housing disposed axially between the turbine housing and the compressor housing. The center housing includes a bearing support surface, which defines a bearing cavity extending along an axis between the turbine housing and the compressor housing. The turbocharger further includes a turbine wheel disposed in the turbine chamber and driven by exhaust gases. The turbocharger further includes a compressor wheel disposed in the compressor chamber for pressurizing an airflow to the internal combustion engine. The turbocharger further includes a shaft having a first end connected to the turbine wheel and a second end connected to the compressor wheel, such that the turbine wheel is capable of driving the compressor wheel to increase the pressure of intake air for the engine. The turbocharger further includes a fluid bearing configured to operably connect the shaft to the center housing. The fluid bearing includes a single-piece bearing sleeve defining a bore that extends along an axis between first and second ends. Each of the first and second ends forms a thrust face for axially supporting the rotor system in the center housing. The sleeve includes first and second bearing portions proximal to an associated one of the first and second ends, and a shank connecting the first and second bearing portions. Each of the first and second bearing portions includes an outer bearing surface that faces the bearing support surface. The outer bearing surface defines a maximum outer diameter for radially supporting the sleeve on an outer film of oil disposed between the outer bearing surface and the bearing support surface. In addition, each of the first and second bearing portions also includes an inner bearing surface that faces the shaft. The inner bearing surface defines a minimum inner diameter for radially supporting the shaft on an inner film of oil disposed between the inner bearing surface and the shaft. The inner bearing surface is a continuous surface free of any grooves. The sleeve has a wall thickness defining a plurality of oil passages spaced from the inner bearing surface and configured to supply oil to the thrust face.

In one aspect, the shank includes an outer shank surface that defines a plurality of inlets fluidly communicating with an associated one of the oil passages for supplying oil to the oil passages.

In another aspect, each of the first and second bearing portions includes an inner sleeve surface extending between the inner bearing surface and the thrust face. The inner sleeve surface is spaced radially outward from the shaft, and at least one of the inner sleeve surface and the thrust face defines a plurality of outlets fluidly communicating with an associated one of the oil passages for receiving oil from the oil passages.

In another aspect, the outer shank surface defines a reduced outer diameter, and the reduced outer diameter is smaller than the maximum outer diameter of the outer bearing surface.

In another aspect, the inner sleeve surface defines an increased inner diameter, and the increased inner diameter is larger than the minimum inner diameter of the inner bearing surface, and wherein the inner sleeve surface is spaced radially outward from the shaft.

In another aspect, the increased inner diameter of the inner sleeve surface is smaller than the reduced outer diameter of the outer shank surface. The oil passages extend perpendicularly relative to the axis such that the oil passages extend radially inward from the outer shank surface to the inner sleeve surface.

In another aspect, the inner sleeve surface diverges radially outward, relative to the axis, from the inner bearing surface to the thrust face, such that the inner sleeve surface is angularly disposed relative to the axis.

In another aspect, the outer shank surface includes an outer cylindrical surface and a pair of shoulders, and each shoulder is angularly disposed relative to the axis and extends between the outer cylindrical surface and the associated outer bearing surface.

In another aspect, the oil passages extend from the outer shank surface to the thrust face such that each oil passage is angularly disposed relative to the axis.

According to several aspects of the present disclosure, a turbocharger for an internal combustion engine of a motor vehicle is provided. The turbocharger includes a turbine housing defining a turbine chamber, a compressor housing defining a compressor chamber, and a center housing disposed axially between the turbine housing and the compressor housing. The center housing includes a bearing support surface that defines a bearing cavity extending along an axis between the turbine housing and the compressor housing. The turbocharger further includes a turbine wheel disposed in the turbine chamber and driven by exhaust gases. The turbocharger further includes a compressor wheel disposed in the compressor chamber for pressurizing an airflow to the internal combustion engine. The turbocharger further includes a shaft having a first end connected to the turbine wheel and a second end connected to the compressor wheel, such that the turbine wheel is capable of driving the compressor wheel to increase the pressure of intake air for the engine. The turbocharger further includes a fluid bearing and a pair of thrust bearings axially supporting the fluid bearing within the center housing. The fluid bearing is configured to operably connect the shaft to the center housing. The fluid bearing includes a single-piece bearing sleeve defining a bore that extends along an axis between first and second ends. Each of the first and second ends forms a thrust face that faces an associated one of the thrust bearings. The thrust bearings and thrust face cooperate such that the sleeve is axially constrained at least partially within the center housing. The sleeve further includes first and second bearing portions proximal to an associated one of the first and second ends, and a shank connecting the first and second bearing portions. Each of the first and second bearing portions includes an outer bearing surface that faces the bearing support surface. The outer bearing surface defines a maximum outer diameter for radially supporting the sleeve on an outer film of oil disposed between the outer bearing surface and the bearing support surface. In addition, each of the first and second bearing portions also includes an inner bearing surface that faces the shaft. The inner bearing surface defines a minimum inner diameter for radially supporting the shaft on an inner film of oil disposed between the inner bearing surface and the shaft. The inner bearing surface is a continuous surface free of any grooves. The sleeve has a wall thickness defining a plurality of oil passages spaced from the inner bearing surface, and the oil passages are configured to supply oil to the thrust face and the associated thrust bearing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
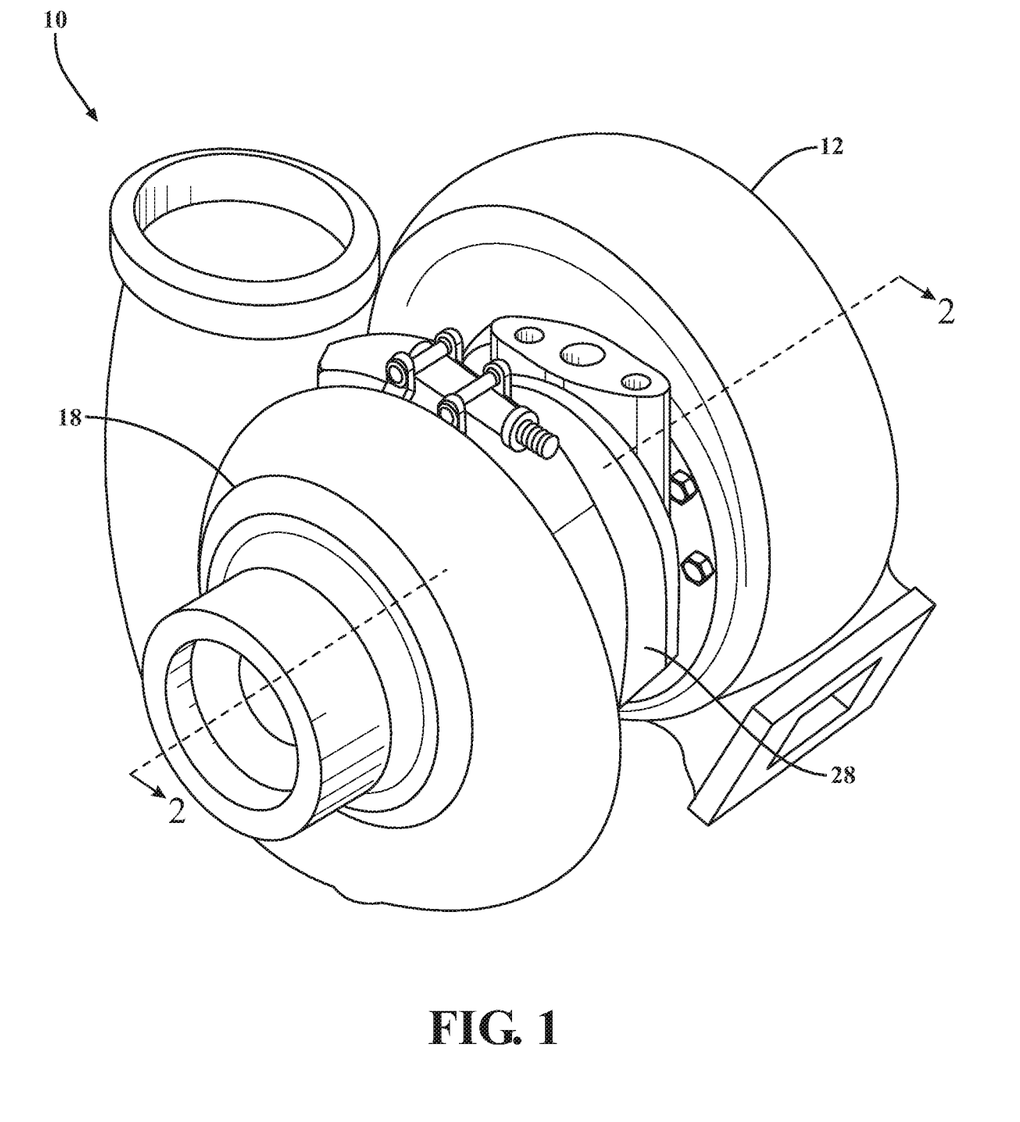
FIG. 1 is a perspective view of a turbocharger for delivering pressurized air to an internal combustion engine of a motor vehicle.
Figure 2:
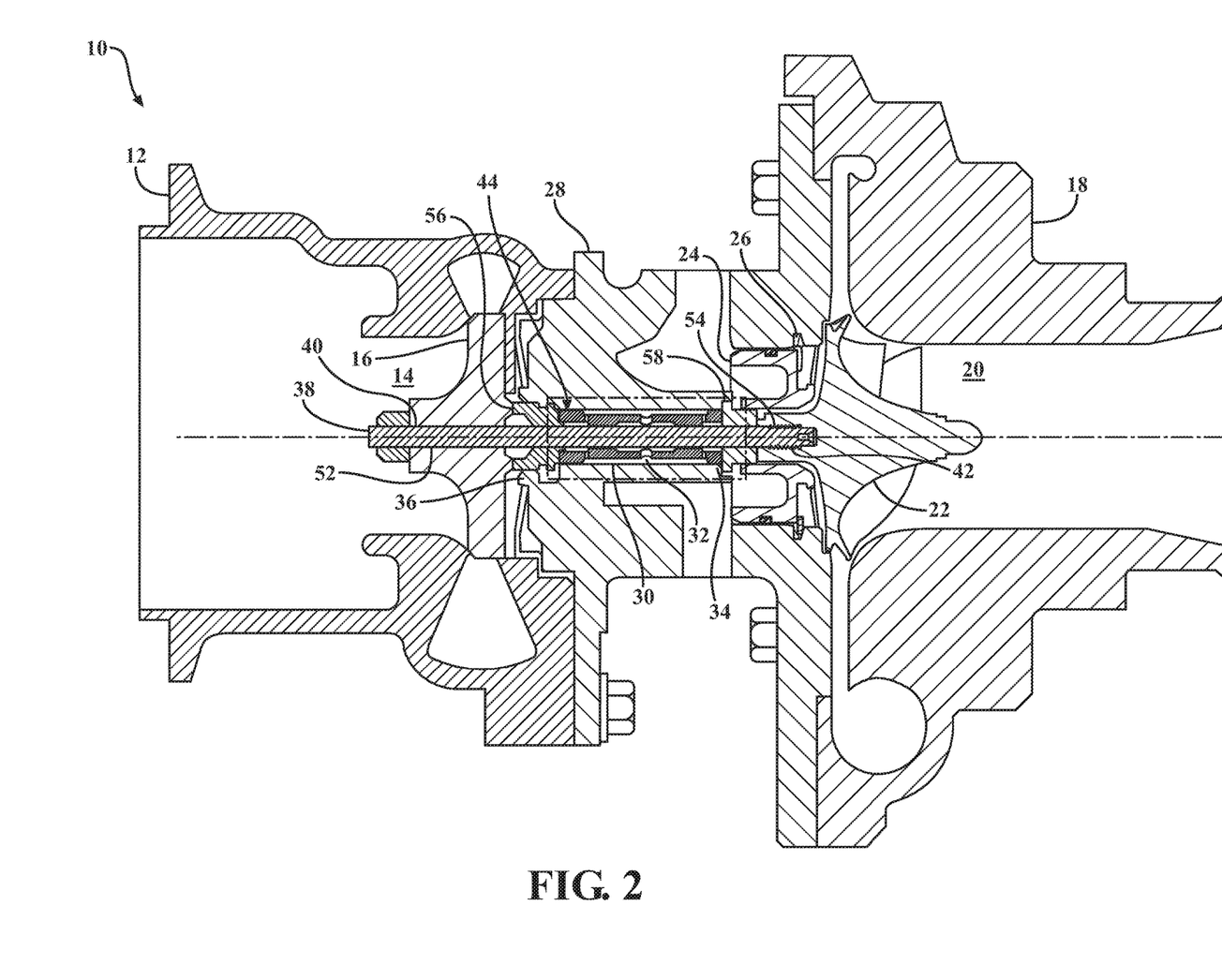
FIG. 2 is a cross-sectional view of the turbocharger of FIG. 1 as take along line 2-2.

Referring to FIGS. 1 and 2, a turbocharger for an internal combustion engine of a motor vehicle is shown and generally indicated by reference number 10. The turbocharger 10 may be of any of a variety of different turbocharger types without departing from the scope or intent of the present disclosure. For example, the turbocharger 10 may be a single-scroll turbocharger, a twin-scroll turbocharger, a variable geometry turbocharger, an electric turbocharger, or the like.

Referring to FIG. 2, the turbocharger 10 includes a turbine housing 12, which defines a turbine chamber 14, and a turbine wheel 16 disposed in the turbine chamber 14 and driven by exhaust gases.

The turbocharger 10 further includes a compressor housing 18, which defines a compressor chamber 20, and a compressor wheel 22 disposed in the compressor chamber 20 for pressurizing an airflow to the internal combustion engine. In this example, the turbocharger 10 further includes an annular backplate 24 connected directly to the compressor housing 18. More specifically, the annular backplate 24 is connected to the compressor housing 18 by a fastener or fasteners 26. The fastener 26 may be a circlip, an e-clip, a snap ring, or other fasteners 26 of the like. In other embodiments, the annular backplate can be connected to other components of the turbochargers by any suitable fastening method.

The turbocharger 10 further includes a center housing 28 disposed axially between the turbine housing 12 and the compressor housing 18. The center housing 28 includes a bearing support surface 30 defining a bearing cavity 32 extending along an axis between the turbine housing 12 and the compressor housing 18. The bearing cavity 32 has opposite ends 34, 36 facing the compressor housing 18 and the turbine housing 12 respectively. One end 34 faces the compressor housing 18 and is adapted to receive the annular backplate 24. In other embodiments, the center housing may be formed unitarily formed with the compressor housing.

The turbocharger 10 further includes a shaft 38 having a first end 40 connected to the turbine wheel 16 and a second end 42 connected to the compressor wheel 22, such that exhaust gas spins the turbine wheel 16, the shaft 38, and the compressor wheel 22 to increase the pressure of intake air for the engine.

Figure 3:
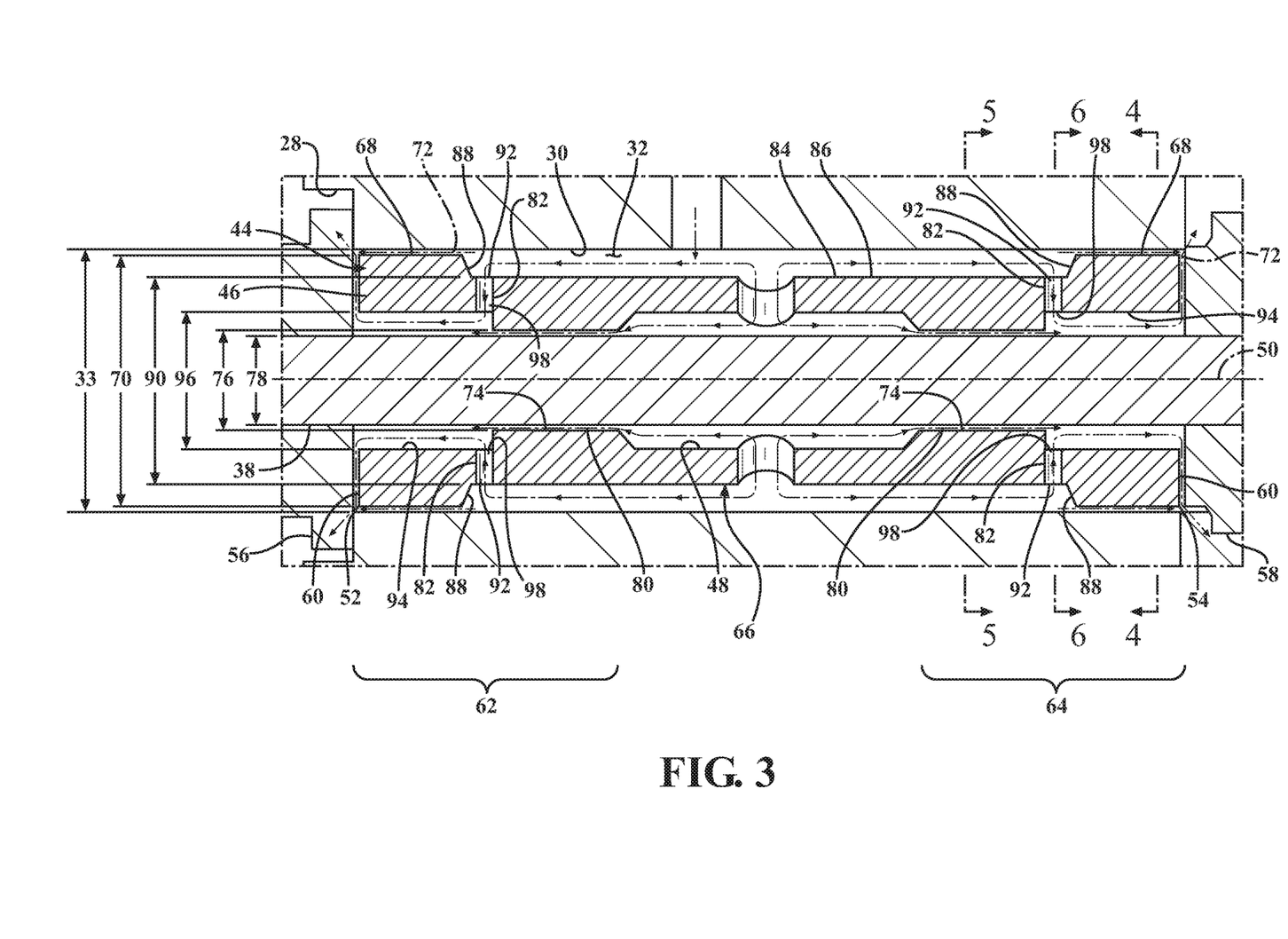
FIG. 3 is an enlarged cross-sectional view of the turbocharger of FIG. 2, illustrating the turbocharger including one embodiment of a fluid bearing having a single-piece bearing sleeve with a plurality of oil passages.

Referring to FIG. 3, the turbocharger 10 further includes a fluid bearing 44 configured to operably connect the shaft 38 to the center housing 28. The fluid bearing 44 is a single-piece bearing sleeve 46 ("sleeve") disposed within the bearing cavity 32 of the center housing 28. The sleeve 46 defines a bore 48 that extends along an axis 50 between first and second ends 52, 54. The turbocharger 10 further includes first and second thrust bearing shoulders 56, 58, and each of the first and second ends 52, 54 forms a thrust face 60 that faces an associated one of the thrust bearing shoulders 56, 58. The thrust bearing shoulders 56, 58 and thrust faces 60 cooperate with one another to axially constrain the sleeve 46 at least partially within the center housing 28. In this example, each thrust face 60 is arranged perpendicularly relative to the axis 50.

The single-piece bearing sleeve 46 includes first and second bearing portions 62, 64 proximal to an associated one of the first and second ends 52, 54, and a shank 66 that connects the first and second bearing portions 62, 64.

Figure 4:
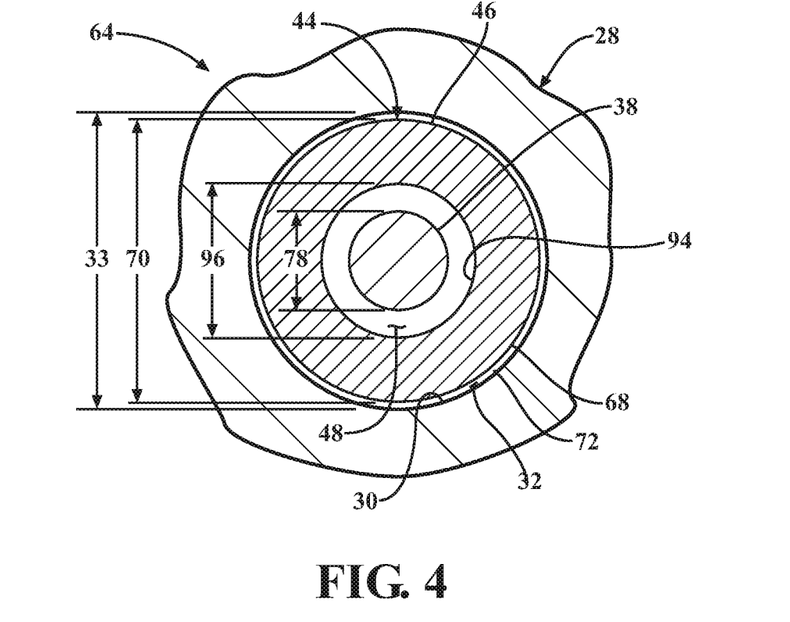
FIG. 4 is a cross-sectional view of the fluid bearing of FIG. 3, as taken along line 4-4.

Referring to FIGS. 3 and 4, each of the first and second bearing portions 62, 64 defines an outer bearing surface 68 that faces the bearing support surface 30 of the center housing 28. The outer bearing surface 68 defines a maximum outer diameter 70 that is smaller than the diameter 33 of the bearing cavity 32, such that the sleeve 46 is radially supported on an outer film of oil 72 disposed between the outer bearing surface 68 and the bearing support surface 30.

Figure 5:
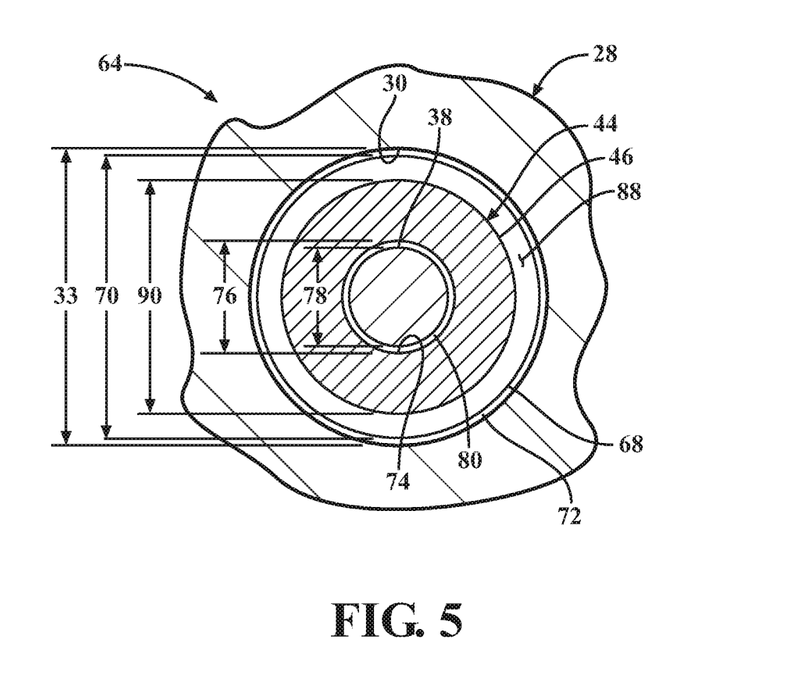
FIG. 5 is a cross-sectional view of the fluid bearing of FIG. 3, as taken along line 5-5.

Referring to FIGS. 3 and 5, each of the first and second bearing portions 62, 64 defines an inner bearing surface 74 that faces the shaft 38. The inner bearing surface 74 defines a minimum inner diameter 76 that is larger than a diameter 78 of the shaft 38, such that the shaft 38 is radially supported on an inner film of oil 80 disposed between the inner bearing surface 74 and the shaft 38. The inner bearing surface 74 is a continuous surface free of any grooves.

Figure 6:
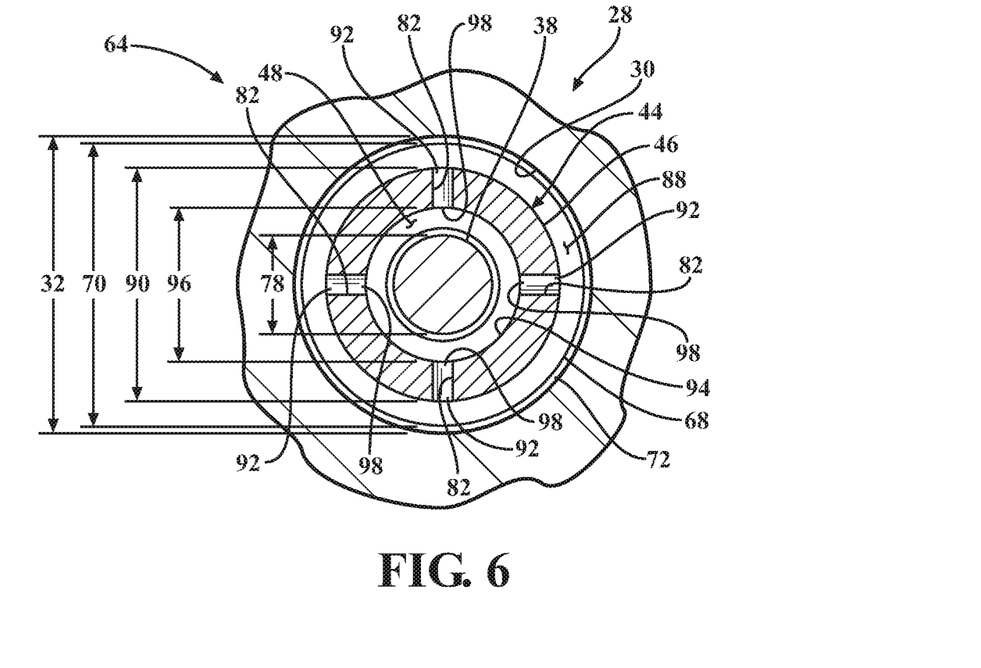
FIG. 6 is a cross-sectional view of the fluid bearing of FIG. 3, as taken along line 6-6.

Referring to FIGS. 3 and 6, each of the first and second bearing portions 62, 64 includes a wall thickness defining a plurality of oil passages 82 configured to supply oil to the thrust faces 60 and associated thrust bearing shoulders 56, 58. As best shown in FIG. 3, the oil passages 82 are spaced from the inner bearing surface 74 and bypass the same, such that the inner bearing surface 74 is a continuous plain surface free of any grooves communicating directly with the inner film of oil 80 between the inner bearing surface 74 and the shaft 38. In this example, each end of the sleeve 46 includes four oil passages 82 that extend perpendicularly to the axis 50 and are angularly spaced about the axis 50 by 90 degrees relative to each other. However, it is contemplated that any section of the sleeve can define any number of oil passages arranged in other suitable positions relative to one another.

More specifically, in this example, the shank 66 includes an outer shank surface 84 extending axially between the first and second bearing portions 62, 64, with the outer shank surface 84 being spaced radially inward from the outer bearing surface 68. The outer shank surface 84 includes an outer cylindrical surface 86 and a pair of shoulders 88. The shoulders 88 are angularly disposed relative to the axis 50, and each of the shoulders 88 extend between the outer cylindrical surface 86 and the associated outer bearing surface 68. The outer cylindrical surface 86 defines a reduced outer diameter 90, which is smaller than the maximum outer diameter 70 of the outer bearing surface 68 and disposed parallel to the axis 50. In this example, the outer cylindrical surface 86 defines a plurality of inlets 92 fluidly communicating with an associated one of the oil passages 82 for supplying oil to the same. In addition, each of the first and second bearing portions 62, 64 also defines an inner sleeve surface 94 disposed parallel to the axis 50 and extending axially between the inner bearing surface 74 and the thrust face 60. The inner sleeve surface 94 is spaced radially outward from the shaft 38. The inner sleeve surface 94 defines an increased inner diameter 96, which is larger than the minimum inner diameter 76 of the inner bearing surface 74 and smaller than the reduced outer diameter 90 of the outer shank surface 84. The inner sleeve surface 94 defines a plurality of outlets 98 fluidly communicating with an associated one of the oil passages 82 for receiving oil from the oil passages 82 and supplying oil to the thrust face 60 and associated thrust bearing. The oil passages 82 extend perpendicularly, relative to the axis 50, and radially inward from the outer shank surface 84 to the inner sleeve surface 94. Furthermore, as shown in FIG. 6, the oil passages 82 are angularly spaced from one another about the axis 50 by a common angle. In this example, four oil passages 82 are angularly spaced from one another by 90 degrees.

Figure 7:
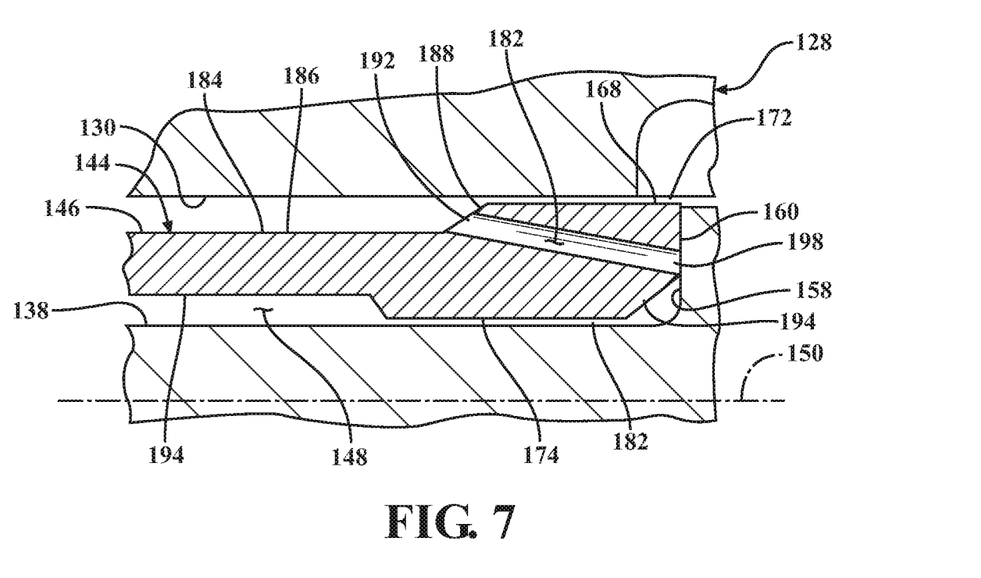
FIG. 7 is an enlarged cross-section view of another embodiment of a fluid bearing.

Referring to FIG. 7, another embodiment of a single-piece bearing sleeve 146 is similar to the sleeve 46 of FIGS. 1-6 and has the same components identified by the same reference numbers increased by 100. However, while the inner sleeve surface 94 of FIG. 3 is disposed parallel to the axis 50, the inner sleeve surface 194 of FIG. 6 diverges radially outward, relative to the axis 150, from the inner bearing surface 174 to the thrust face 160 such that the inner sleeve surface 194 is angularly disposed relative to the axis 150. In addition, while the outer cylindrical surface 86 of FIG. 3 defines the inlets 92 and the inner sleeve surface 94 defines the outlets 98 such that the oil passages 82 are disposed perpendicular to the axis 50, the shoulder 188 of FIG. 7 defines the inlets 192 and the thrust face 160 defines the outlets 198, such that the oil passages 182 extend from the outer shank surface 184 to the thrust face 160 with each oil passage 182 being angularly disposed relative to the axis 150.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A fluid bearing for operably connecting a shaft to a center housing of a turbocharger, the fluid bearing comprising:
   a single-piece bearing sleeve defining a bore that extends along an axis between first and second ends, wherein each of the first and second ends forms a thrust face for axially supporting the sleeve in the center housing;
   wherein the sleeve comprises first and second bearing portions proximal to an associated one of the first and second ends, and a shank connecting the first and second bearing portions;
   wherein each of the first and second bearing portions defines:
      an outer bearing surface defining a maximum outer diameter for radially supporting the sleeve on the center housing; and
      an inner bearing surface defining a minimum inner diameter for radially supporting the shaft in the bore, wherein the inner bearing surface comprises a circumferentially continuous and fully annular surface that is free of any grooves;
   wherein the sleeve comprises a wall thickness defining a plurality of oil passages spaced from the inner bearing surface and configured to supply oil to the thrust face;
   wherein each of the first and second bearing portions comprises an inner sleeve surface extending between the inner bearing surface and the proximal thrust face, and at least one of the inner sleeve surface and the thrust face defines a plurality of outlets fluidly communicating with an associated one of the oil passages for receiving oil from the oil passages;
   wherein the inner sleeve surface defines an increased inner diameter, and the increased inner diameter is larger than the minimum inner diameter of the inner bearing surface.

2. The fluid bearing of claim 1, wherein the shank comprises an outer shank surface that defines a plurality of inlets fluidly communicating with an associated one of the oil passages for supplying oil to the oil passages.

3. The fluid bearing of claim 2, wherein the outer shank surface defines a reduced outer diameter, and the reduced outer diameter is smaller than the maximum outer diameter of the outer bearing surface.

4. The fluid bearing of claim 1, wherein the increased inner diameter of the inner sleeve surface is smaller than the reduced outer diameter of the outer shank surface, wherein the oil passages extend perpendicularly relative to the axis, and the oil passages extend radially inward from the outer shank surface to the inner sleeve surface.

5. The fluid bearing of claim 2, wherein the inner sleeve surface diverges radially outward, relative to the axis, from the inner bearing surface to the thrust face, such that the inner sleeve surface is angularly disposed relative to the axis.

6. The fluid bearing of claim 5, wherein the outer shank surface comprises an outer cylindrical surface and a pair of shoulders, wherein each shoulder is angularly disposed relative to the axis and extends between the outer cylindrical surface and the associated outer bearing surface.

7. The fluid bearing of claim 6, wherein the oil passages extend from the outer shank surface to the thrust face such that each oil passage is angularly disposed relative to the axis.

8. The fluid bearing of claim 6, wherein the oil passages are angularly spaced from one another about the axis by a common angle.

9. A turbocharger for an internal combustion engine of a motor vehicle, the turbocharger comprising:
   a turbine housing defining a turbine chamber;
   a compressor housing defining a compressor chamber;
   a center housing disposed axially between the turbine housing and the compressor housing, and the center housing comprises a bearing support surface that defines a bearing cavity extending along an axis between the turbine housing and the compressor housing;
   a turbine wheel disposed in the turbine chamber and driven by exhaust gases;
   a compressor wheel disposed in the compressor chamber for pressurizing an airflow to the internal combustion engine;
   a shaft having a first end connected to the turbine wheel and a second end connected to the compressor wheel, such that the turbine wheel is capable of driving the compressor wheel to increase the pressure of intake air for the engine; and
   a fluid bearing configured to operably connect the shaft to the center housing, wherein the fluid bearing comprises:
      a single-piece bearing sleeve defining a bore that extends along an axis between first and second ends, wherein each of the first and second ends forms a thrust face for axially supporting the sleeve in the center housing;
      wherein the sleeve comprises first and second bearing portions proximal to an associated one of the first and second ends, and a shank connecting the first and second bearing portions;
      wherein each of the first and second bearing portions defines:
         an outer bearing surface facing the bearing support surface and defining a maximum outer diameter for radially supporting the sleeve on an outer film of oil disposed between the outer bearing surface and the bearing support surface; and
         an inner bearing surface facing the shaft and defining a minimum inner diameter for radially supporting the shaft on an inner film of oil disposed between the inner bearing surface and the shaft, wherein the inner bearing surface comprises a circumferentially continuous and fully annular surface that is free of any grooves; and
      wherein the sleeve comprises a wall thickness defining a plurality of oil passages spaced from the inner bearing surface and configured to supply oil to the thrust face.

10. The turbocharger of claim 9, wherein the shank comprises an outer shank surface that defines a plurality of inlets fluidly communicating with an associated one of the oil passages for supplying oil to the oil passages.

11. The turbocharger of claim 10, wherein each of the first and second bearing portions comprises an inner sleeve surface extending between the inner bearing surface and the thrust face, wherein the inner sleeve surface is spaced radially outward from the shaft, and at least one of the inner sleeve surface and the thrust face defines a plurality of outlets fluidly communicating with an associated one of the oil passages for receiving oil from the oil passages.

12. The turbocharger of claim 11, wherein the outer shank surface defines a reduced outer diameter, and the reduced outer diameter is smaller than the maximum outer diameter of the outer bearing surface.

13. The turbocharger of claim 12, wherein the inner sleeve surface defines an increased inner diameter, and the increased inner diameter is larger than the minimum inner diameter of the inner bearing surface, and wherein the inner sleeve surface is spaced radially outward from the shaft.

14. The turbocharger of claim 13, wherein the increased inner diameter of the inner sleeve surface is smaller than the reduced outer diameter of the outer shank surface, wherein the oil passages extend perpendicularly relative to the axis, and the oil passages extend radially inward from the outer shank surface to the inner sleeve surface.

15. The turbocharger of claim 11, wherein the inner sleeve surface diverges radially outward, relative to the axis, from the inner bearing surface to the thrust face, such that the inner sleeve surface is angularly disposed relative to the axis.

16. The turbocharger of claim 15, wherein the outer shank surface comprises an outer cylindrical surface and a pair of shoulders, wherein each shoulder is angularly disposed relative to the axis and extends between the outer cylindrical surface and the associated outer bearing surface.

17. The turbocharger of claim 16, wherein the oil passages extend from the outer shank surface to the thrust face such that each oil passage is angularly disposed relative to the axis.

18. A turbocharger for an internal combustion engine of a motor vehicle, the turbocharger comprising:
a turbine housing defining a turbine chamber;
a compressor housing defining a compressor chamber;
a center housing disposed axially between the turbine housing and the compressor housing, and the center housing comprises a bearing support surface that defines a bearing cavity extending along an axis between the turbine housing and the compressor housing;
a turbine wheel disposed in the turbine chamber and driven by exhaust gases;
a compressor wheel disposed in the compressor chamber for pressurizing an airflow to the internal combustion engine;
a shaft having a first end connected to the turbine wheel and a second end connected to the compressor wheel, such that the turbine wheel is capable of driving the compressor wheel to increase the pressure of intake air for the engine;
a pair of thrust bearings; and
a fluid bearing configured to operably connect the shaft to the center housing, wherein the fluid bearing is axially supported within the center housing by the thrust bearings, and the fluid bearing comprises:
a single-piece bearing sleeve defining a bore that extends along an axis between first and second ends, wherein each of the first and second ends forms a thrust face facing an associated one of the thrust bearings, wherein the thrust bearings and thrust face cooperate such that the sleeve is axially constrained at least partially within the center housing;
wherein the sleeve comprises first and second bearing portions proximal to an associated one of the first and second ends, and a shank connecting the first and second bearing portions;
wherein each of the first and second bearing portions defines:
an outer bearing surface facing the bearing support surface and defining a maximum outer diameter for radially supporting the sleeve on an outer film of oil disposed between the outer bearing surface and the bearing support surface; and
an inner bearing surface facing the shaft and defining a minimum inner diameter for radially supporting the shaft on an inner film of oil disposed between the inner bearing surface and the shaft, and wherein the inner bearing surface comprises a circumferentially continuous and fully annular surface that is free of any grooves; and
wherein the sleeve comprises a wall thickness defining a plurality of oil passages spaced from the inner bearing surface and configured to supply oil to the thrust face and the associated thrust bearing.

* * * * *